United States Patent [19]
Bold et al.

[11] Patent Number: 5,540,038
[45] Date of Patent: Jul. 30, 1996

[54] LAWN AND GARDEN CHIPPER/SHREDDER VACUUM APPARATUS

[75] Inventors: Alfred J. Bold, Waterford; Irving Lobdell, Averill Park, both of N.Y.

[73] Assignee: Garden Way Incorporated, Troy, N.Y.

[21] Appl. No.: 253,683

[22] Filed: Jun. 3, 1994

[51] Int. Cl.$^6$ .......................... A01D 34/68; B02C 18/08
[52] U.S. Cl. .............. 56/13.1; 56/13.4; 56/16.9; 56/320.1; 56/DIG. 8; 241/101.1; 241/101.7
[58] Field of Search .................. 56/13.1, 13.4, 56/16.9, 255, 295, 320.1, 320.2, DIG. 8, DIG. 9; 241/101.1, 101.7

[56] References Cited

U.S. PATENT DOCUMENTS

| Re. 29,139 | 2/1977 | Massner | 56/13.1 |
|---|---|---|---|
| 4,263,771 | 4/1981 | Iaboni et al. | 56/13.4 |
| 5,085,043 | 2/1992 | Hess et al. | 56/10.5 |
| 5,231,827 | 8/1993 | Connelly et al. | |
| 5,381,970 | 1/1995 | Bold et al. | 241/101.7 X |

*Primary Examiner*—Terry Lee Melius
*Attorney, Agent, or Firm*—Heslin & Rothenberg

[57] ABSTRACT

Lawn and garden maintenance equipment for collecting and shredding debris and chipping branches is provided with wheel support, a housing, and a handle for guiding the apparatus, the housing having a substantially closed bottom wall below a motor-driven disc for rotation about a vertical axis, which disc is capable of chipping branches because of a knife on one side and of moving air because of blades on the other side. A circumfirentially extending screen within the housing is supported in a vertical orientation relative to the ground, which screen is formed of at least two segments, both of which are supported radially inwardly and spaced from the sidewalls of the housing. The air and entrained debris are drawn into and enters the housing through an inlet extending to a centrally disposed axial opening whereby the entrained air and debris are driven against the screen to be broken up into smaller pieces. The debris thereafter is propelled from the space between the screen and the sidewall to a rear exit from the housing. Cleaning of the screen and replacement of the screen are facilitated by creating a screen comprised of two arcuate segments, one of the segments being supported adjacent an access door provided in the housing. The access door is removable by disabling a safety interlock through removal of a special fastener captive on the access door, the fastener upon initial withdrawal serving to actuate a switch to disable the engine drive to the disk, the fastener being of such a length as to require more than the average amount of time for its full withdrawal, thereby permitting the disk (and engine) to achieve its rest position.

18 Claims, 4 Drawing Sheets

5,540,038

LAWN AND GARDEN CHIPPER/SHREDDER VACUUM APPARATUS

FIELD OF THE INVENTION

This invention generally relates to lawn and garden maintenance equipment and is more particularly directed to a device having improved shredding features and safety features.

BACKGROUND OF THE INVENTION

In U.S. Pat. No. 5,231,827 Connolly et at, assigned to the assignee of the present invention, apparatus which combines the activities of branch clipping, leaf and debris shredding and debris collection including vacuuming on a single chassis without use of accessory elements is well known in the art.

It is a principal object of this invention to provide apparatus that provides more efficient and improved shredding action and improved air flow for the collection of leaves and other debris.

It is a further object for this invention to significantly increase screen area for shredding purposes with improved high volume airflow while permitting easy screen removal for cleaning purposes.

It is a still further object of this invention to provide a lawn and garden shredder having an easily removable multiple part shredding screen which cooperate with a safety interlock to effectively preclude removal while the apparatus is in operation.

It is a still further object of this invention to provide apparatus for vacuuming and shredding lawn and garden debris which apparatus has at least one easily removable shredding screen which can be facilely removed for cleaning and/or replacement yet which is provided with a safety interlock precluding access to the screen or the removal of the screen while the apparatus is in operation.

Other objects will be in part obvious and in part pointed out more in detail hereinafter.

A better understanding of this invention will be obtained from the following detailed description and accompanying drawings of illustrative applications of the invention.

SUMMARY OF THE INVENTION

The lawn and garden maintenance equipment of this invention is capable of collecting and shredding debris and is provided with a housing and motor means supported thereon to power a vertically oriented shaft; the housing includes ground engaging support wheels on downwardly extending side walls. Within the housing but supported in spaced relationship from the side walls is substantially vertically disposed, generally circularly oriented multi section screen which is spaced inwardly from the downwardly extending sidewalls so as to provide a generally annular chamber between the screen and the sidewall. A disc located within the housing is rotated by the engine to drive suitable disc mounted blades to move air thereby to collect lawn debris. The need for cleaning and removal of at least one of the shredding screen sections within the apparatus is achieved through a safety access door provided in the housing, which door permits removal of a screen section. Because of special fastening apparatus including an interlock switch and an extended length threaded bolt captive on the cover, the engine of the apparatus is made non-operable by activation of an interlock that is controlled by the bolt. Initial bolt movement deenergizes the engine but multiple turns required for bolt removal allows the engine speed to drop to zero.

Although this invention has been illustrated and described with respect to exemplary embodiments thereof, it should be understood by those skilled in the art that various changes, omissions and additions may be made without departing from the spirit and scope of the invention.

BRIEF DESCRIPTION OF THE DRAWINGS

FIG. 3a is a partial enlargement of the dotted line circle potion of FIG. 3 showing details of the interlock; and, FIG. 3b is a view similar to that of FIG. 3a showing additional details of the interlock.

DESCRIPTION OF A PREFERRED EMBODIMENT

This application is related to application Ser. No. 08/253,665 filed Jun. 3, 1994 in the names of Steven Kodesch and Alfred Bold entitled BAG ATTACHMENT WITH SAFETY FEATURE FOR APPARATUS, now abandoned, and assigned to the assignee of the present invention.

Figure 1:
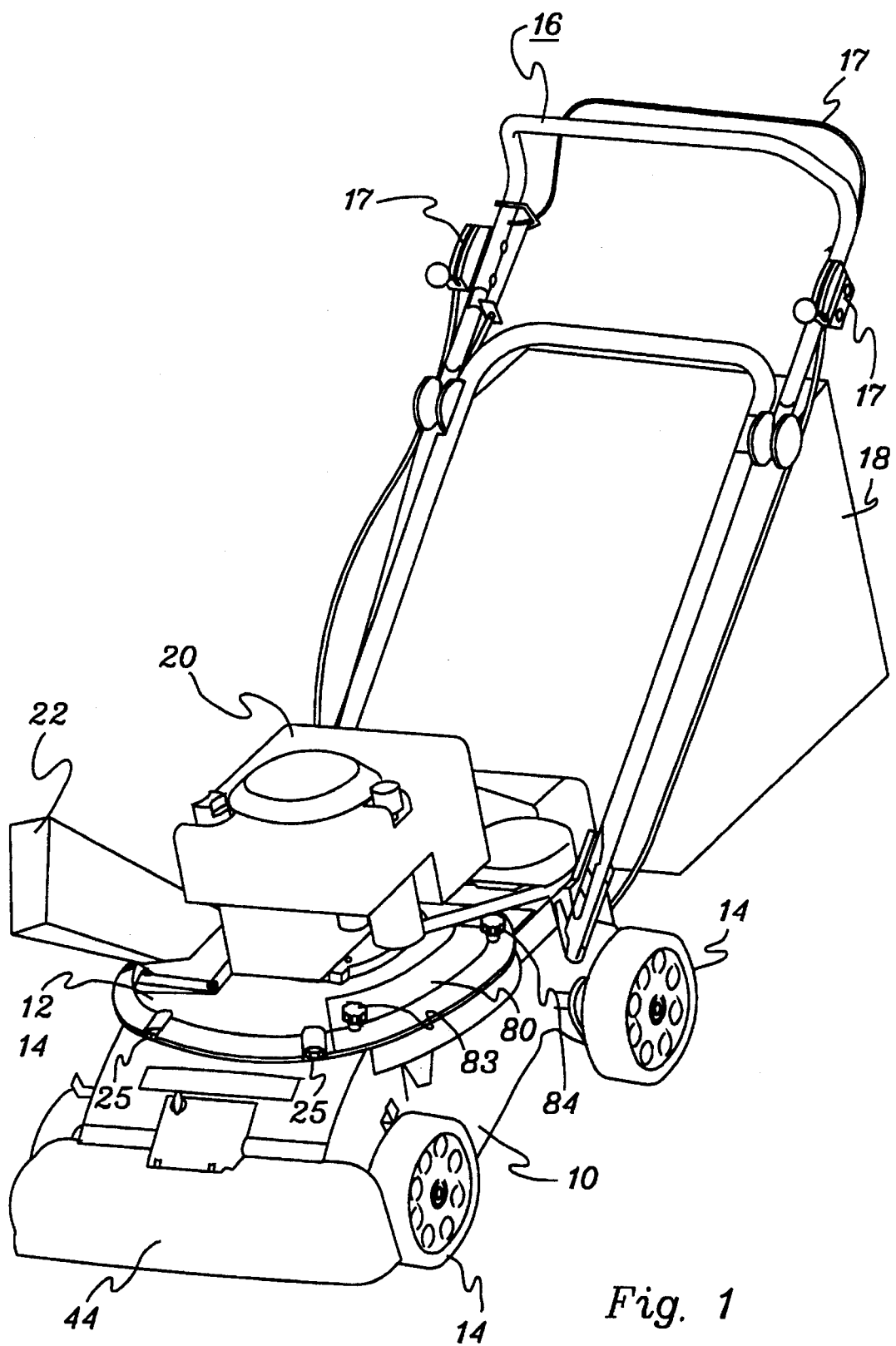
FIG. 1 is a top perspective view of the apparatus of this invention.

Turning to the drawings and initially to FIG. 1 thereof, it is seen that the apparatus of this invention generally comprises a base housing 10, a top housing 12, base housing 10 being supported for movement on ground engaging wheels 14 and having a handle assembly 16 for guiding the apparatus along the ground. Handle assembly 16 is provided with appropriate controls 17 including engine throttle control, clutch control and operator presence control as needed or required. Handle assembly 16 also supports a suitable collection bag 18 for the garden debris and the like. A gasoline engine 20 is mounted on top housing 12 and a chipper inlet chute 22 is provided for feeding limbs and the like through top housing 12. Base housing 10 and top housing 12 can be conveniently formed from a suitable high strength plastic, but materials used for the housing, bag handle bars etc. form no part of this invention. Top housing 12 is secured to base housing 10 with a plurality of suitable fasteners 25 all in accordance with conventional assembly and mounting techniques to provide gasoline motor driven apparatus for movement in a controlled manner along the ground.

Figure 2:
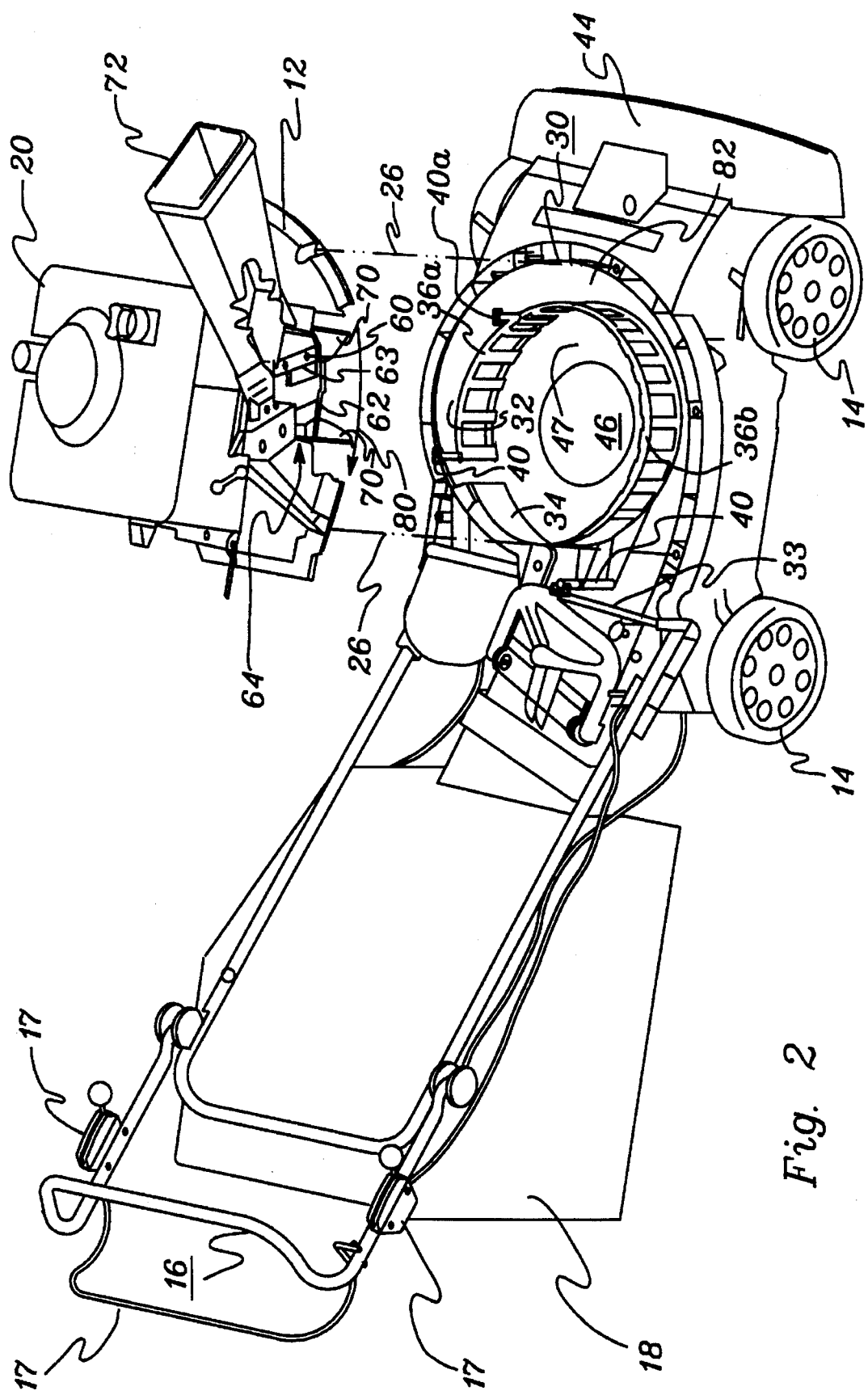
FIG. 2 is a partially exploded top perspective view of the invention of FIG. 1 with a portion cut away.
Figure 4:
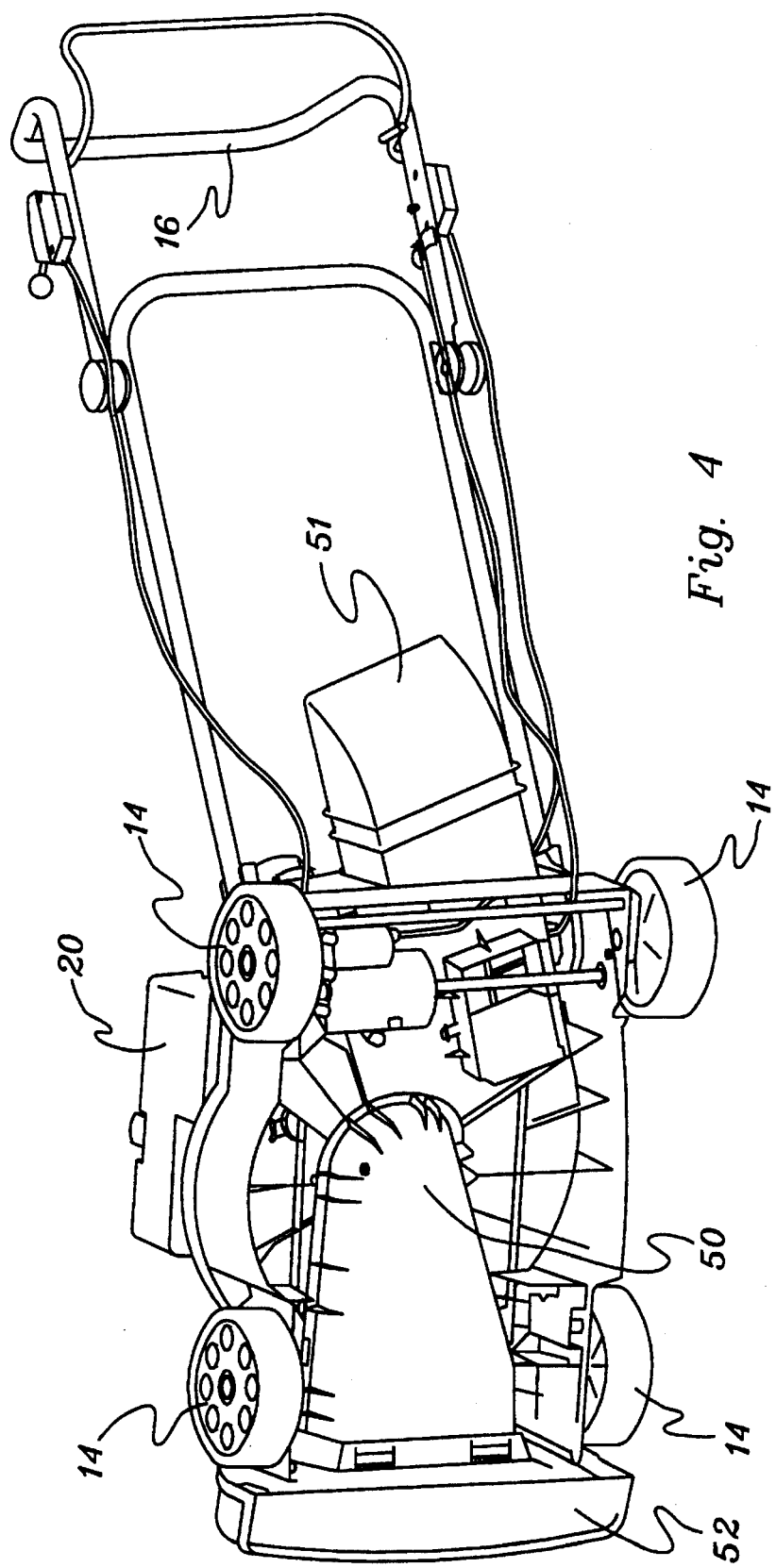
FIG. 4 is a bottom view of the apparatus with the collection bag removed.

Turning next to FIG. 2, it is seen that base housing member 10 and top housing member 12 have been separated by removal of fasteners 25 with the dotted lines 26 showing the general mating relationship and direction of separation. Base housing 10 is provided with a recessed central area generally designated 30 having sidewalls 32 of a generally arcuate configuration, which sidewalls lead to exit opening 33. It is noted for completeness that sidewall portion 34 protrudes radially inwardly and continues the general arcuate circumference of screens 36a and 36b. Screens 36a and 36b are themselves arcuate and form roughly 270° of the circumference of a circle when positioned end to end as shown in FIG. 2, and are supported on base housing 10 by removable pull-pin fasteners 40; in reality pull-pin fastener 40a serves to secure screen 36a and 36b in end overlap relationship whereas the removable pin fasteners 40 are used to secure the free ends of screen portions 36a and 36b. Base housing 10 also supports air and debris inlet housing or nozzle 44 and a centrally disposed aperture 46 of a diameter less than the effective screen diameter is formed in the bottom of recess 30 in base housing portion 47. As best seen in FIG. 4, inlet housing 44 has an inlet 52 on its under side for collecting leaves and other debris communicating with the chamber between bottom closure 50 and base housing portion 47 (see FIG. 2), which bottom closure is suitably secured to the underside of base housing member 10 to create a closed passageway from inlet 52 to the centrally disposed aperture 46 in recess 30. Various ribs and lines shown in FIG. 4 provide the desired strengthening and related support for the housing member and the bottom 50 and are matters of design.

While still viewing FIG. 4, it is seen that outlet 33 (FIG. 2) is provided with a deflector member 51 which directs air and entrained materials exiting the opening 33 in a generally upward direction to better fill bag 18.

Returning to FIG. 2, it is seen that top housing portion 12 is partially cut away and inlet chute 22 is partially cut away to show a chipper knife 60 mounted on disc 62 with cooperating aperture 63 therein to permit chips to proceed through disc 62 and engageable with anvil 64. The underside of disc 62 is provided with a plurality of fan blades 70 (two of which are shown in the cut-away portion) with rotation of the disc being in the direction of arrow 80. The disc rotates about a vertical axis, the output shaft axis of engine 20.

It is observed for purposes of clarity that generally annular passageway 82 extends between and is defined by screen portions 36a and 36b and arcuate housing sidewall 32 thereby describing a generally annular outlet chamber leading to exit 33. Hence, debris entering through passageway 52 in nozzle 44 proceeds through the closed passageway (formed by bottom 50) through aperture 46 of recess housing portion 47 and through screen portions or segments 36a and 36b. Top housing 12 and its engine driven disc 62 together with the fan blades 70 draw air in through nozzle 44 and passageway 52 such that debris entering by such a path proceeds through aperture 46 and the chips entering through aperture 63 in disc 62 are combined in the air flow to be driven against the screen elements 36a and 36b to enter passageway 82 so as to effect significant reduction in particle size.

Figure 3:
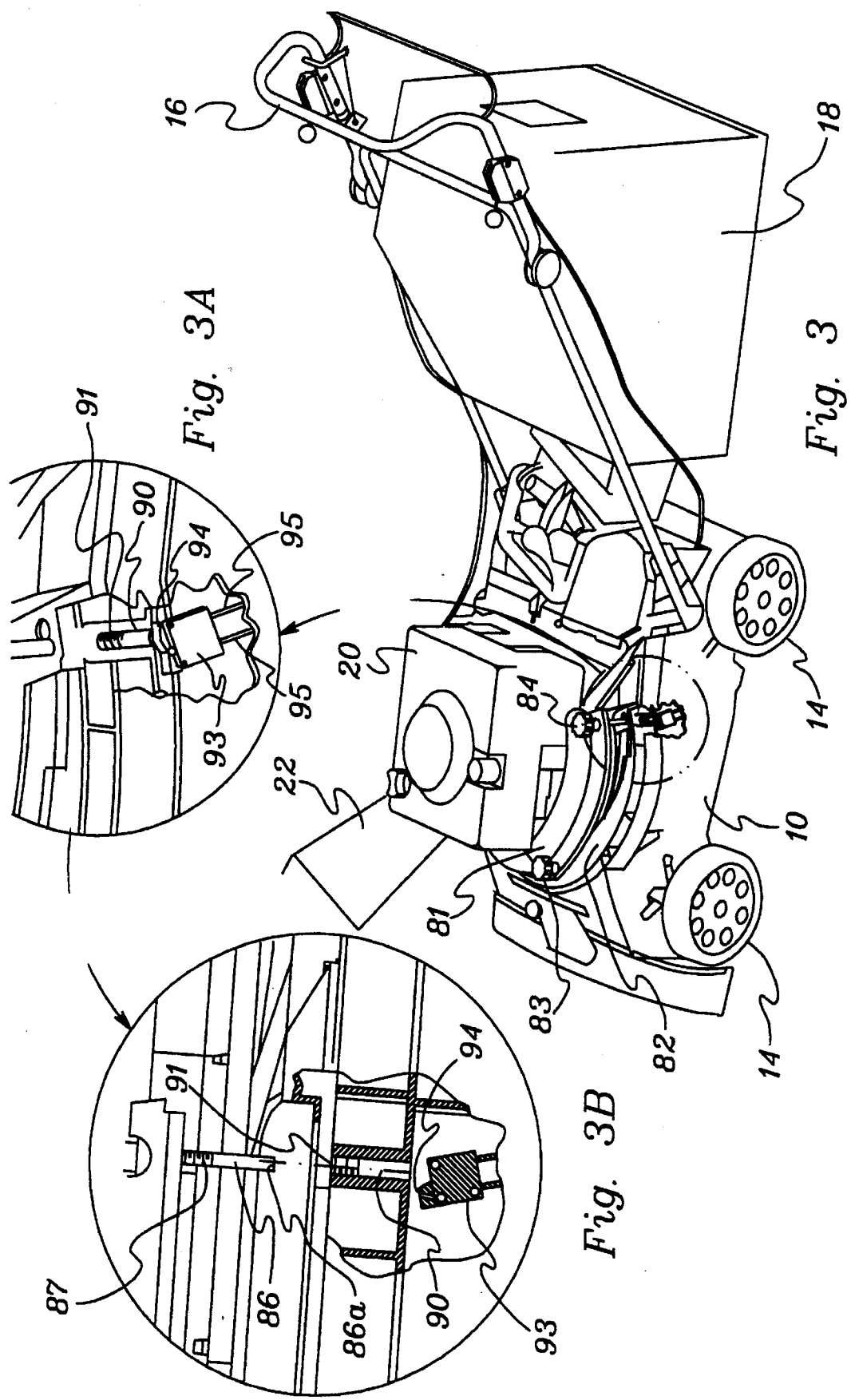
FIG. 3 is a side perspective view of the apparatus of FIG. 1 with the access cover partially removed.

Turning next to FIGS. 3, 3a and 3b it is seen that safety access cover 81 is provided to close a suitable opening in base housing 10, which opening is aligned with screen portion 36a, the cover 81 being secured by threaded fasteners 83 and 84 captive to cover 80 in any desired manner to suitable threaded portions 91 formed in projection 90 in base housing portions. Fastener 83 enters into a suitable projection in base portion 10 (not shown) to fasten one end of the cover 81 in position. The other end of the cover is secured by fastener 84 (best seen in the enlarged portions of FIG. 3, FIG. 3a and 3b) which threaded fastener 84 has an elongated end portion 86 and an upper threaded portion 87, the threaded portion engaging mating threads in the threaded projection 90 from base housing portion 10.

Positioned below passageway 91 in projection 90 is a suitable switch 93 having a switch operator 94, which switch operator is engageable by end 86a of fastener 86. By circuitry not shown (which circuitry is of a conventional nature) switch 93 is connected through wires 95 to ground the primary ignition for gasoline motor 20 thereby to shut motor 20 off when operator 94 of switch 93 is permitted to rise during initial removal of stud 86.

It is thereby established that a safety access opening with cover 80 through which screen portion 36a can be removed is provided, which access opening cover is fastened in place by two captive threaded fasteners 83 and 84. Threaded fastener portion 86 is engageable with an interlock grounding switch so that, upon even partial initial removal of that threaded fastener, the gasoline drive is grounded and the motor rapidly comes to a halt, generally well before it is possible to completely remove the threaded fastener and remove cover 80 from the opening so as to gain access to the hazards of the rotating disc fan blades and the like. Moreover, lift pins 40a and 40 are accessible upon cover removal so that screen 36a can be released from its mounting and may be removed through the access opening for cleaning and/or replacement by a screen or grid of different size or use of no screen.

It is therefore seen that the present invention also provides improved air flow for a vertical axis motor driven fan utilizing an improved inner chamber whereby air is brought in through a central bottom opening, to be forced through a screen grillwork into a generally annular chamber which leads to the exit opening.

The present invention also provides for the facile removal of at least a portion of the screen assembly with a suitable safety interlock provided to preclude unintended dangerous access.

Although this invention has been illustrated and described with respect to exemplary embodiments thereof, it should be understood by those skilled in the art that various changes, omissions and additions may be made without departing from the spirit and scope of the invention.

We claim:

1. Lawn and garden maintenance equipment for collecting leaves and garden debris and the like comprising:

a base housing, said base housing having downwardly extending sidewalls and ground engaging support wheels;

motor drive and top housing means supporting said motor drive on said base housing with an output drive shaft of said motor drive supported for rotation about a vertical axis, said base housing and top housing forming an open bottom chamber;

a horizontally disposed disc connected to said drive shaft for rotation therewith within said housings and provided with radially extending air movement blades, each blade having a tip;

substantially horizontally extending, removable, arc-shaped screen means spaced inwardly from said downwardly extending sidewalls of the base housing and having a total arc length greater than 180°;

the tips of said blades rotating within a circumference described by said screen means;

a forward facing air inlet and a bottom closure for said chamber, said forward facing inlet cooperating with said bottom closure for said housing and forming an inlet passageway for air and entrained debris, said passageway terminating in a central opening generally coaxial with the motor drive shaft, said disc and said blades with the bottom closure forming an axial inlet blower for air and entrained debris;

an outlet for debris drawn through said inlet and forced through said screen means; and said outlet being in a rear facing portion of said housing whereby air and other debris is reduced in size by engagement with the screen means and discharged through the screen means to an exit opening, said screen means being of a sufficient total arc length to prevent its complete removal from said housing through said outlet.

2. Lawn and garden maintenance equipment for collecting leaves and garden debris and the like comprising:

a base housing, said base housing having downwardly extending sidewalls and ground engaging support wheels;

motor drive and top housing means supporting said motor drive on said base housing with an output drive shaft of said motor drive supported for rotation about a vertical axis, said base housing and top housing forming an open bottom chamber;

a horizontally disposed disc connected to said drive shaft for rotation therewith within said housings and provided with radially extending air movement blades;

substantially vertically supported generally circular screen means spaced inwardly from said downwardly extending sidewalls of the base housing and extending a substantial distance thereabouts;

the tips of said blades rotating within a circumference described by said screen means;

a forward facing air inlet and a bottom closure for said chamber, said forward facing inlet cooperating with said bottom closure for said housing and forming an inlet passageway for air and entrained debris, said passageway terminating in a central opening generally coaxial with the motor drive shaft, said disc and said blades with the bottom closure forming an axial inlet blower for air and entrained debris;

an outlet for debris drawn through said inlet and forced through said screen means;

said outlet being in a rear facing portion of said housing whereby air and other debris is reduced in size by engagement with the screen means and discharged through the screen means to an exit opening;

wherein said screen means is comprised of two screen portions;

support means are provided to removeably attach said two screen portions in end to end relationship within said housing; and and a removable access panel is provided in said housing in alignment with one screen portion to permit removal of said one screen portion for cleaning and replacement.

3. The equipment of claim 2 wherein a removable fastener extends through said access panel, the end of said fastener being engageable with switch means supported by said housing to deenergize said motor drive, said fastener having a long threaded body engageable with the housing such that multiple rotations of the fastener are required for its removal following initial removal rotation that deenergizes said switch means.

4. The equipment of claim 2 wherein said screen portions are limited in circumferential length to permit facile removal of at least one of said screen portions through said removable access panel and the other of said screen portions is of a circumferential length to permit removal through the rear facing outlet, each said screen portion being held in a position spaced from the fan blade tips and the sidewall in the chamber by suitable removable fasteners.

5. The equipment of claim 3 wherein said screen portions are limited in circumferential length to permit facile removal of at least one of said screen portions through said removable access panel and the other of said screen portions is of a circumferential length to permit removal through the rear facing outlet, each said screen portion being held in a position spaced from the sidewall in the chamber by suitable removable fasteners.

6. The equipment of claim 2 wherein the total screen circumference is interrupted and separated by a projecting portion of said housing sidewall, substantially coplanar with said screen, said sidewall cooperates with said two screen portions which total circumferentially 360°.

7. The equipment of claim 3 wherein the total screen circumference is interrupted and separated by a projecting portion of said housing sidewall, substantially coplanar with said screen, said sidewall cooperates with said two screen portions which total circumferentially 360°.

8. The equipment of claim 5 wherein said two screen portions and the housing sidewall projection define a partial annular inlet chamber between said screen portions and said housing sidewall thereby to increase the chamber area to improve shredding action while allowing greater air flow with entrained debris.

9. The equipment of claim 8 wherein said annular chamber is formed by said base housing, said bottom closure and said top housing.

10. The apparatus of claim 1 wherein a projecting knife is supported on the top of said disc, an aperture is provided in said disc adjacent said knife and feed means extending through the top housing in alignment with said knife as the disc rotates to effect chipping action of branches extending into said feed means the chips being fed into the space between the screen and side wall.

11. Lawn and garden maintenance equipment for collecting and shredding debris comprising:

housing means having ground engaging wheels thereon and supporting a motor having a vertical shaft with a horizontally extending disc affixed thereto, said disc having air movement blades on its lower surface;

a bottom closure for said housing, said housing and bottom closure forming an inlet and an outlet for air and entrained debris; and screen means supported horizontally in said housing means perpendicular to said vertical shaft and spaced from the sidewalls of said housing means and positioned so that debris must pass through said screen means before reaching said outlet, said screen means extending at least 270° about the circumference of said disc.

12. Lawn and garden maintenance equipment for collecting and shredding debris comprising:

a housing;

drive means mounted on the housing and having a shaft extending into the housing for rotation about a vertical axis;

a disk mounted on the shaft for rotation therewith and positioned within a chamber in said housing;

an arcuate screen assembly disposed within said chamber in said housing, said arcuate screen assembly comprising a first arcuate screen portion and a second arcuate screen portion, said first arcuate screen portion and said second arcuate screen portion together defining a total arc length for said arcuate screen assembly of greater than 180° about said shaft, said first arcuate screen portion and said second arcuate screen portion each being removable from said housing through a different access opening;

an inlet in said housing in communication with said chamber for collecting debris to be shredded; and an outlet from said housing in communication with said chamber for removing shredded debris from said chamber through said arcuate screen assembly.

13. The equipment of claim 12, wherein an access opening for said first arcuate screen portion comprises said outlet in said housing.

14. The equipment of claim 13, wherein said second arcuate screen portion is removable through an access panel in said housing to allow cleaning or replacement thereof.

15. The equipment of claim 14, wherein said access panel is secured to said housing by a fastener apparatus, said faster apparatus including switch means to deenergize said drive means whenever said access panel is at least partially removed from said housing.

16. The equipment of claim 15, wherein said drive means comprises a gasoline motor.

17. The equipment of claim 12, wherein said arcuate screen assembly and an inner wall of said housing define an annular passageway which forms a portion of said outlet from said housing.

18. The equipment of claim 17, wherein a protrusion in said inner wall of said chamber is radially aligned to a circumferential extension of said arcuate screen assembly such that debris within said chamber must exit said chamber through said annular passageway after passing through said arcuate screen assembly.

* * * * *